G. ROSECRANS.
Hay-Elevator.

No. 212,747. Patented Feb. 25, 1879.

WITNESSES
William H. Rosecrans
R. Fred Leming

INVENTOR.
George Rosecrans

UNITED STATES PATENT OFFICE.

GEORGE ROSECRANS, OF MORAVIA, NEW YORK.

IMPROVEMENT IN HAY-ELEVATORS.

Specification forming part of Letters Patent No. 212,747, dated February 25, 1879; application filed March 14, 1877.

*To all whom it may concern:*

Be it known that I, GEORGE ROSECRANS, of Moravia, in the county of Cayuga and State of New York, have invented certain new and useful Improvements in Cars for Unloading Hay or Grain in Barns and Sheds; and I do hereby declare that the following is a full, clear, and exact description of the same, reference being had to the accompanying drawings, making a part of this specification, in which—

Figure 1:
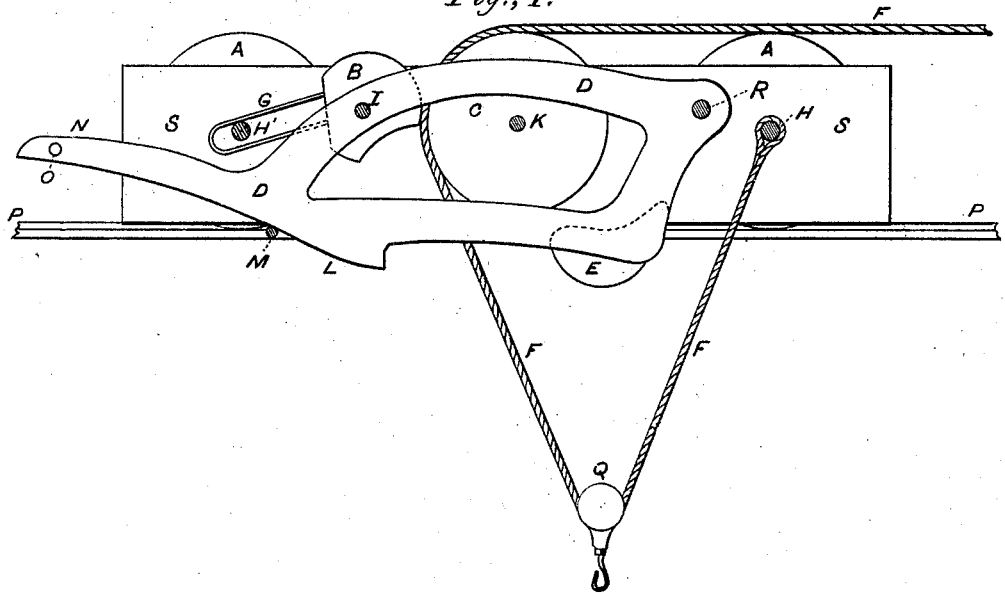
Figure 2:
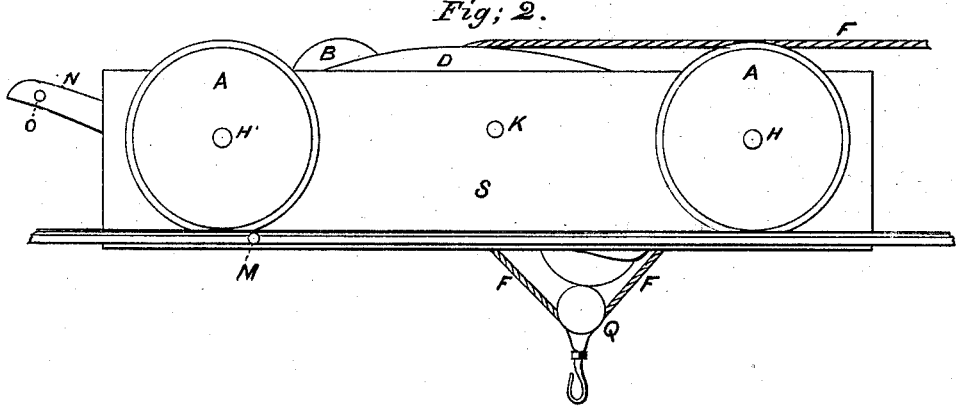

Figure 1 is a sectional elevation of a car embodying the improvements in this invention, and Fig. 2 is a side elevation of the car employed in elevating hay and grain.

This invention relates to hay-elevators, or cars for unloading hay and grain in barns and sheds; and it consists in the improvements in the construction of the same hereinafter fully described, and particularly pointed out in the claims.

In the accompanying drawings similar letters of reference indicate corresponding parts in the figures.

P represents the car-track; S, the car-frame, and A A the wheels. A rope, F, one end of which is secured to a shaft or axle, H, carries the hook and block Q, and passes over the pulley C, turning on shaft K. A dog, D, having notch L and arms N, is pivoted between the sides of the car-frame S on the shaft R.

A rod, O, connects the arms N, as shown. At the lower part of the dog D is secured the block E, and between the arms I is pivoted a segment-cam, B, provided with arms G, encircling a shaft, H'.

The notch L engages with the rod M, to hold the car on the track while the load is being elevated. When the block Q, to which the loaded fork is attached, strikes the block E, the dog is raised, and the cam B drops down upon the rope F, holds it against the pulley C, and prevents it from slipping.

The arms G pass around the rod or axle H', and act as a brace to prevent the cam from slipping on the rope. The car, when the dog D is released, may be moved to any point on the track. When the car is moved back, the arms of the dog D strike the pin M, which raises the dog, whereby the cam B is raised and the rope F loosened.

Having thus fully described my invention, what I claim as new and useful, and desire to secure by Letters Patent, is—

1. In a hay-elevator, the combination of the pivoted segmental cam B, having arms G, embracing the axle H', with the pivoted dog D E, pulley C, and rope and block F Q, substantially as and for the purposes set forth.

2. In a hay-elevator, the combination of the dog D, pivoted at R, and provided with block E and notch and arms L N, adapted to operate in connection with a pin, M, in the track, with the pulley C, cam B G H', and rope and block F Q, substantially as set forth.

GEO. ROSECRANS.

Witnesses:
   WILLIAM H. ROSECRANS,
   P. FRED. DEERING.